R. H. WARREN.
DUST-BRUSHES.

No. 172,530. Patented Jan. 18, 1876.

Witnesses
Horace Harris
A. L. Cross

Inventor
Robert H. Warren.

UNITED STATES PATENT OFFICE.

ROBERT H. WARREN, OF NEWARK, NEW JERSEY.

IMPROVEMENT IN DUST-BRUSHES.

Specification forming part of Letters Patent No. 172,530, dated January 18, 1876; application filed August 7, 1875.

*To all whom it may concern:*

Be it known that I, ROBERT H. WARREN, of Newark, in the county of Essex and State of New Jersey, have invented certain Improvements in Dust-Brushes, of which the following is a specification:

My invention consists in the mode of constructing the shank for a wool dust-brush, and also of attaching the material to form the brush thereto.

Figure 1:
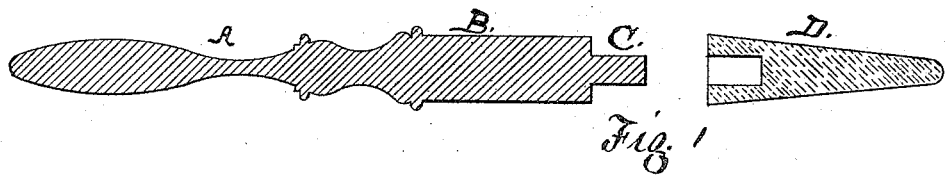
Figure 2:
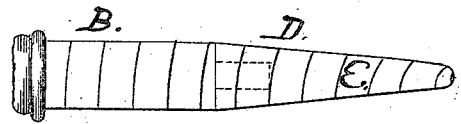

Figure 1 is a longitudinal section of the handle and shank. Fig. 2 shows the two parts of the shank united, and the order of winding strips around it to form a brush.

The handle A is made so as to form, also, the part B of the shank, and this part terminates with a short spindle, C. The tip D of the shank is made of a tapering rubber piece, like a cone, solid, except at the point of its contact with the part B, where it has a hole fitting it to slip on the spindle, to which it is secured by glue or otherwise. This rubber tip gives elasticity and durability to the brush, and enables it to be worked into any small place or crevice and remove the dust, with no damage to the most fragile things, the end of the rubber hitting nothing to harm it. My brush is now to be made by cutting strips E, about one inch wide, from sheep or goat skins tanned with the wool or hair on, and usually from those where the fiber has been colored on the skin. I then, by a wire or otherwise, secure one end of this strip to the tip of the rubber, and commence winding in a spiral form toward the handle, allowing the extending strip to lap onto the wound part as it advances. This binds the edges and keeps the fibers extending toward the tip. These strips may be dampened before they are put on; then, when dry, they will adhere more closely to the shank. Instead of the strip being all one color, pieces with diverse colors may be tacked or sewed together in one strip and wound up, thus forming a pleasant variety. At the point of contact with the handle the brush is bound and finished tastefully. The whole becomes a showy, durable, and very superior hand-brush.

I do not claim the use of skins with the wool or hair on *per se*, for I know that Jerome H. Bishop makes a brush with the skins having the wool on, cut and made in rolls and filled with cotton for a shank, but my improvement consists in winding strips with the wool or hair on in a spiral form about the shank having the rubber tip, making thus an elastic brush.

I claim—

The wool dust-brush, composed with the shank parts B and D, in combination with sheep-skin with the wool on, cut in strips, and wound, lapping, in a spiral form, from the tip to the handle, substantially as and for the purposes specified.

ROBERT H. WARREN.

Witnesses:
HORACE HARRIS,
A. L. CROSS.